Jan. 29, 1924.
T. H. KANE
1,481,912
JOIST WELDING MACHINE
Filed Aug. 15, 1923
2 Sheets-Sheet 1
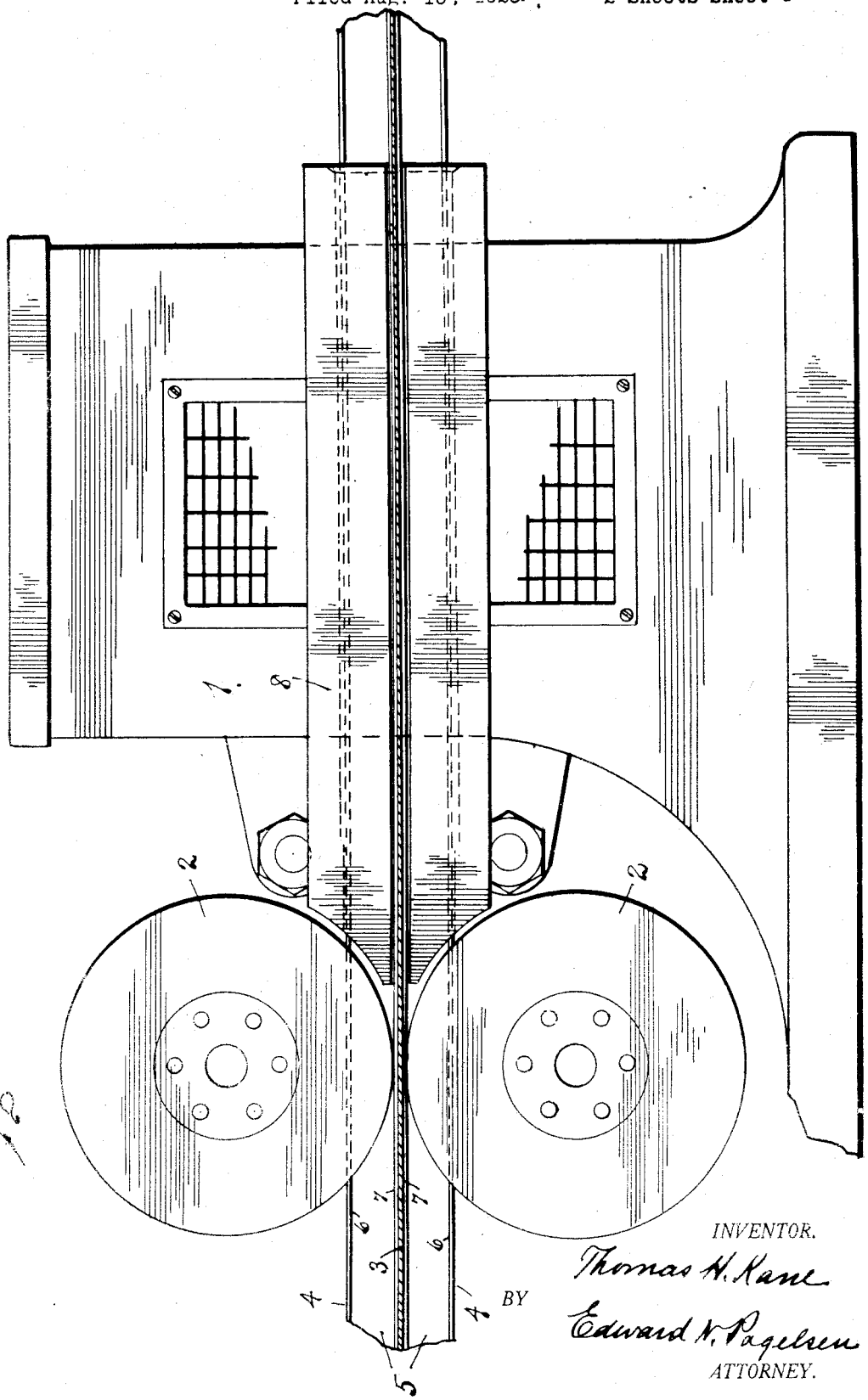
INVENTOR.
Thomas H. Kane
BY Edward N. Pagelsen
ATTORNEY.

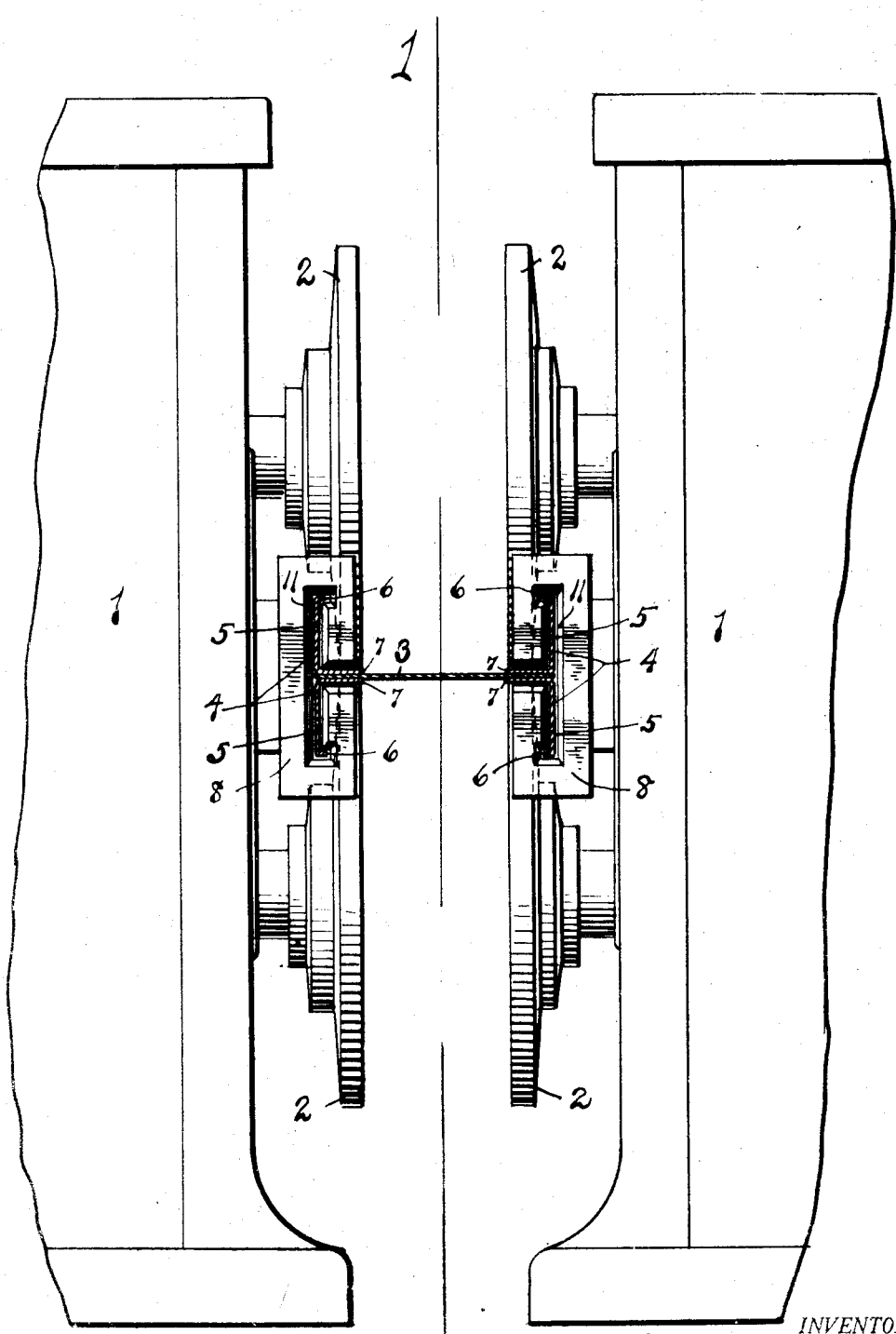

Patented Jan. 29, 1924.

1,481,912

UNITED STATES PATENT OFFICE.

THOMAS H. KANE, OF YOUNGSTOWN, OHIO, ASSIGNOR TO TRUSCON STEEL COMPANY, OF YOUNGSTOWN, OHIO, A CORPORATION OF MICHIGAN.

JOIST-WELDING MACHINE.

Application filed August 15, 1923. Serial No. 657,479.

*To all whom it may concern:*

Be it known that I, THOMAS H. KANE, a citizen of the United States, and residing at Youngstown, in the county of Mahoning and State of Ohio, have invented a new and Improved Joist-Welding Machine, of which the following is a specification.

This invention relates to means adapted to be attached to a spot-welding machine for positioning the angle bars which are attached to the narrow plates which are to constitute the webs of light built-up I-beams or joists of which the angle bars are to constitute the flanges, and its object is to provide mechanism of this character which shall be positive in its action and which can be produced at small cost.

This invention consists in a pair of guides for the edges of the plates constituting the webs of light built-up I-beams and for the angle bars which are to be welded to the edges of these plates, these guides having T-shaped grooves which are so positioned that the flanges of the angle bars that are to be welded to the web plates will be forced to pass between the rotatable disk-electrodes of a spot-welding machine. It further consists of the details of construction illustrated in the accompanying drawings and particularly pointed out in the claims.

In the accompanying drawings, Fig. 1 is a section on the line 1—1 of Fig. 2. Fig. 2 is an end view of a spot welding machine provided with guides for the parts of the I-beams which are to be spot-welded together by this machine.

Similar reference characters refer to like parts throughout the several views.

The welding machines 1, shown in the drawings are of well known design and are usually in pairs and each is equipped with a pair of rotatable disks 2, usually of copper and constituting electrodes which not only conduct the welding current at the proper times, but also feed the work along, stopping at intervals to permit the current to accomplish the welding and then after waiting a sufficient time for the welds to harden, feed the work another step. As the details of such machines and of the devices for adjusting them and their electrodes form no part of the present invention, none are shown.

The I-beams when assembled consist of webs 3 and angle bars 4, the latter being preferably bent up of sheet metal to provide wide lateral flanges 5 which may have their edges 6 bent inward to constitute stiffening ribs. The angle bars also embody the flanges 7 which are held against the sides of the webs 3 at their edges.

The welding disks 2 are rotated intermittently by proper mechanism and the guides 8 to hold the work in proper position are formed with T-shaped grooves 9 to receive the webs 3 and angle bars 4 and these guides are secured to the welding machines 1 in any desired manner with the central portions of their grooves in the same plane and the portions which receive the flanges 5 parallel to each other so that the work passing through will be in proper position to be welded. The plane of the central portions of the two guide grooves is tangent to the disks 2. The result is that the I-beams produced are always of the same height, that the parts need not be secured together before being slipped into the guides, that the parts may be slipped into the guides by unskilled labor, and that the rate of production of the machines is high. It is to be understood however that one pair of disks 2 and one guide 8 may be employed if desired.

The details of the guides, the angles of the bevels 11 at the entrance ends of the guides, and the proportions of the parts may all be changed by those skilled in the art without departing from the spirit of my invention as set forth in the following claims.

I claim:

1. A joist welding machine embodying two pairs of disk-electrodes rotating intermittently between welds, and a pair of guides each having T-shaped guiding grooves, the central portions of said grooves being in the same plane and tangent to the electrode disks.

2. A joist welding machine embodying disk-electrodes rotating intermittently between welds, and guiding means having grooves to receive the webs and angle bars which are to constitute built up metal joists, the webs being held tangent to the disks.

THOMAS H. KANE.